United States Patent Office 3,681,015
Patented Aug. 1, 1972

3,681,015
PURIFICATION OF GASES
Abraham P. Gelbein, Plainfield, and Benjamin J. Luberoff, Summit, N.J., assignors to The Lummus Company, Bloomfield, N.J.
No Drawing. Continuation-in-part of application Ser. No. 585,761, Oct. 11, 1966. This application Jan. 21, 1970, Ser. No. 4,770
Int. Cl. B01d 53/34
U.S. Cl. 23—2 R       7 Claims

ABSTRACT OF THE DISCLOSURE

Acidic gases are removed from gas streams by contacting the stream with a solvent composition comprising (a) an organic solvent which is liquid at room temperature, has a solubility for $CO_2$ at 25° C. and atmospheric pressure of not less than about one volume of $CO_2$ per volume of solvent, said solvent having a boiling point at atmospheric pressure of at least about 150° C., being unreactive with amines and containing at least one functional group other than hydroxyl, characterized by the presence of an element selected from the group consisting of oxygen, nitrogen, sulfur and phosphorus, the functional groups present in the solvent molecule in number exceeding the number of hydroxyl groups when the molecule contains more than one hydroxyl group and (b) a secondary monohydric alkanolamine.

BACKGROUND OF THE INVENTION

This invention relates to purification of gases, particularly gases rich in hydrogen and hydrocarbons, such as synthesis gas and natural gas, and in particular to improved solvent systems for the removal of acid gas constituents (for example $CO_2$ and $H_2S$) from streams of such gases.

It is well known in the art that an efficient method of removing acid gases from gas streams is to contact the gas stream countercurrently with an organic solvent containing an alkanolamine. For systems in which dehydration of the gas stream is also desired absorbent solutions consisting of polyhydric alcohols or monohydric alcohols admixed with alkanolamines such as monoethanolamine, diathanolamine, and diisopropanolamine have been used. More recently, organic solvents such as sulfolane and 1,3-dioxolanes admixed with similar alkanolamines have been suggested. Improved solvent systems containing 1,3-dioxolanes are more fully described and claimed in copending application Ser. No. 586,246, filed Oct. 12, 1966, now Pat. No. 3,502,428 assigned to the assignees hereof. The present application is a continuation in part of application Ser. No. 585,761, filed Oct. 11, 1966, and now abandoned.

From the point of view of efficient mass and heat transfer, it is generally desirable that the absorbent solution have a low viscosity. Mass transfer rates of acid gases such a $CO_2$ from a gas stream into a liquid absorbent are adversely affected when the absorbent is unduly viscous, because high liquid viscosity tends to favor the creation of a boundary layer at the liquid surface which quickly becomes saturated with the absorbed gas. When this happens, further absorption cannot take place until the boundary layer is either replaced, by passing fresh liquid absorbent into the absorption zone, or disrupted, for example by agitating the liquid absorbent, so as to expose the nonsaturated adsorbent beneath the boundary layer. All such measures necessarily increase capital costs by requiring larger or more complicated equipment, or increase the operating cost by requiring additional power for pumping, agitation, etc. Usually, both capital and operating costs are increased.

Heat transfer characteristics of the system are adversely influenced in a similar way when the viscosity of the absorbent is excessive, by the formation of a static boundary layer which serves to insulate the underlying liquid absorbent, and similar measures must be taken to overcome this problem, also with an adverse effect on capital and operating costs. All of these factors combine to make it highly desirable that the absorbent solution be of low viscosity.

PRIOR ART

One of the earliest organic solvent-amines system used for acid gas removal and simultaneous dehydration consisted of a glycol and monoethanol amine, a primary alkanol amine. The pure glycols normally gave relatively high viscosities but in admixture with monoethanolamines, which has a very low viscosity, a solution of acceptable viscosity characteristics is obtained. However, there are generally known drawbacks to the use of glycols as the organic solvent and monoethanolamine as the amine component. The glycols have low solubility for acid gases while the primary amines are highly basis substances which make it difficult to regenerate the acid gases from solution. Furthermore, the regenerated solutions, still containing considerable amounts of acid gases are known to be corrosive to carbon steel. The general high chemical reactivity of primary amines also makes them unsuitable for use with the more recently suggested solvents such as sulfolane.

These problems have been circumvented in the art by using as the amine component the less reactive secondary dialkanolamines, diethanolamine and diisopropanolamine in admixture with organic solvents having good acid gas solubility characteristics. This, however, has been at the expense of a drastic increase in the viscosity of the absorbent solutions.

An object of this invention, therefore, is to provide improved methods for the removal of acidic gases from gas streams.

Another object is to provide improved solvent systems for the removal of acid gases from gas streams.

Still another object is to provide solvent systems of low viscosity.

A further object is to provide solvent compositions which are readily regenerated after use by removing acidic gas constituents dissolved therein.

Another object is to provide such solvent systems which are substantially non-corrosive toward carbon steel.

Still another object is to provide solvent systems of the type described, which are characterized by high solubility for $CO_2$, other acid gas components such as $H_2S$, $SO_2$, etc.

Other objects and advantages will become apparent from the following more complete description and claims.

SUMMARY OF THE INVENTION

In one particularly desirable embodiment, this invention contemplates a solvent composition useful for the extraction of acid gases from gas streams, comprising in combination (a) an organic solvent which is liquid at room temperature, having a solubility for $CO_2$ at 25° C. and one atmosphere pressure of not less than about one volume of $CO_2$ per volume of solvent, said solvent having a boiling point at atmospheric pressure of at least about 150° C., being unreactive with amines and containing at least one functional group other than the hydroxyl group, said functional group being characterized by the presence therein of an element selected from the group consisting of oxygen, nitrogen, sulfur and phosphorus, said functional groups being present in the solvent molecule in number exceeding the number of hydroxyl groups when said molecule contains more than one hydroxyl group, and (b) a secondary monohydric alkanolamine.

In another particularly desirable embodiment, this invention contemplates a process for removing acid gas constituents from gas streams, comprising in combination the steps of contacting said gas stream with a liquid solvent composition comprising (a) an organic solvent which is liquid at room temperature, having a solubility for $CO_2$ at 25° C. and atmospheric pressure of not less than about one volume of $CO_2$ per volume of solvent, said solvent being unreactive with amines and containing at least one functional group, other than the hydroxyl group, said functional group being characterized by the presence therein of an element selected from the group consisting of oxygen, nitrogen, sulfur and phosphorus, said functional groups being present in the solvent molecule in number exceeding the number of hydroxyl groups when said molecule contains more than one hydroxyl group, and (b) a secondary monohydric alkanolamine, and separating said gas stream from said solvent composition and acid gas dissolved therein.

The solvent compositions contemplated by the present invention are useful for removing acid gases such as $CO_2$, $SO_2$, $H_2S$, etc. from gas streams such as streams of hydrogen or hydrocarbon-rich gas exemplified by synthesis gas, natural gas and the like, according to methods already well known to the art. Such methods, including countercurrent vapor-liquid extraction in a packed column, countercurrent contacting in a bubble-cap tower and the like, being well known in the art, are not described in detail herein, other than by use of the generic term "contacting."

The principal requirements for the organic solvent are that it have a reasonably good solubility for $CO_2$ and other acidic gases normally found in hydrogen or hydrocarbon-rich gas streams, that it be a liquid of high boiling point and of fairly low viscosity in the pure state, that it be substantially non-corrosive toward common materials used for fabrication of chemical process equipment, and that it be capable of dissolving the amine's portion of the solvent composition without reacting extensively with it. To meet these requirements, the solvent should be somewhat polar in nature, to provide adequate solubility for the amine and for the acidic gas components to be absorbed.

Organic solvents containing at least one functional group other than hydroxyl, wherein the functional group contains at least one of the elements oxygen, nitrogen, sulfur and phosphorus, have been found in general to meet this requirement. Hydroxyl groups may also be present, but if the molecule contains more than one hydroxyl group, the number of functional groups other than hydroxyl, as described above, should exceed the number of hydroxyl groups. Compounds having two or more hydroxyl groups tend to be too reactive with the amine portion of the composition, or to be insufficiently absorptive toward acid gases, unless the number of other functional groups exceeds the number of hydroxyl groups.

The non-hydroxyl functional groups above referred to are preferably characterized by the C—X—C configuration, wherein X represents oxygen, nitrogen, sulfur or phosphorus. Thus the preferred solvents include cyclic and acyclic ethers, glycol ethers, dioxolanes, dioxanes, furans, trioxanes, oxazoles, etc., sulfones and sulfoxides such as sulfolane and dimethyl sulfoxide, substituted and unsubstituted pyrroles such as 2-pyrrolidone, N-methyl pyrrolidone, etc.

DESCRIPTION OF THE PREFERRED EMBODIMENTS

Although all of the above groups of solvents are operable in the practice of the invention, it is preferred for practical reasons to select solvents within these groups which are liquids, but not excessively volatile liquids. Thus, for example, while the dioxanes are operable solvents generally, the unsubstituted dioxanes, having relatively low boiling points (around 100° C.) are not preferred because their relatively high volatility causes them to evaporate partially into the gas stream, so that special precautions must be taken to recover the solvent vapors from the purified gas stream and stripper effluent, which would result in increases in both capital and operating costs. In general, depending on the operating temperature at which the absorption operation is to be carried out, it is preferred to employ solvents boiling well above that temperature—typically, solvents having boiling points in excess of about 150° C.

As to the viscosity of the solvent in the pure state, substantially all solvents which meet the other requirements (including the implied requirements in the term "solvent" i.e. that it be a liquid) have sufficiently low initial viscosities in the pure state so that when assisted by the viscosity reducing properties of the amine (discussed below), they provide low-viscosity solvent systems useful in processes of the type under consideration. Solvents which are liquid at ordinary temperatures generally have molecular weights below about 200.

To avoid corrosive effects on the equipment, the solvent, in aqueous solution, should be substantially neutral, or at least should have a pH no lower than about 4. This requirement normally excludes compounds containing carboxyl groups. Higher pH's, above 7, are permissible, but are not ordinarily exhibited by most of the described oxygen-, nitrogen-, sulfur-, and phosphorus-, containing solvents contemplated in any event.

A fairly wide selection of solvents meeting all of the above criteria is available, as will be apparent to those skilled in the art from the foregoing discussion. Among the preferred solvents may be mentioned particularly sulfolane (tetrahydrothiophene-1, 1-dioxide), and dioxolanes, such for example as 2,2-dimethyl-1,3-dioxolane-4 methanol and other dioxolanes more fully described and listed in the aforesaid copending application.

It has been discovered that substantially all of the above described solvents, even those having relatively high viscosities in the pure state, provide solvent compositions of surprisingly low viscosity when admixed with a particular type of amine, namely a secondary monohydric alkanolamine—i.e. a compound of the general type representable of the formula

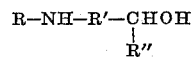

wherein R is a lower alkyl group such as methyl, ethyl, propyl or isopropyl, R' is a lower alkylene group such as methylene, ethylene and the like, including substituted lower alkylene groups in which one or more hydrogen atoms have been replaced by a lower alkyl groups, and R'' is hydrogen or a lower alkyl group. Preferred compounds for use in the practice of this invention include N-methyl ethanolamine and N-ethylethanolamine.

It has also been discovered that amines of this type possess an additional unexpected advantage in that they are miscible with the desired organic solvents to a greater extent than are the previously used amines. By way of example, Table I shows that a mixture of bis-2-methoxyethyl ether and N-methylethanolamine had a viscosity of 1.1 centistokes, whereas the same ether was found immiscible with diethanolamine, the closest alkanolamine, the closest alkanolamine analog of N-methylethanolamine.

The ratio of amine to organic solvent in the solvent compositions according to this invention may be varied over rather wide limits, for example from about 0.1 to 10 mols of amine per liter of organic solvent. Preferably, the amine is present in concentration between about 2.5 N and 5.0 N with respect to the organic solvent, disregarding the water content, if any.

The separation of the enriched solvent from the purified gas stream is carried out according to conventional methods appropriate to the apparatus selected for contacting, and is not described in detail. In general, such separation is carried out by passing the gas-liquid mixture into one or more vapor-disengaging zones, wherein the liquid collects at the bottom and is drawn off therefrom, while the vapor is drawn off from the vapor space at the top of the disengaging zone. In a packed tower or bubble-cap tower, for example, using countercurrent flow with the solvent passing downwardly, such a vapor-disengaging zone may take the form of an enclosed, unpacked zone below the packed zone (or below the lowermost bubble tray), having a dished bottom with a central, valved outlet through which accumulated enriched solvent may be withdrawn, while disengaged vapor together with fresh feed gas passes upwardly through the column.

The stripping operation is also carried out according to conventional techniques, and need not be described in detail. In accordance with conventional practice, such stripping is a form of steam distillation, wherein steam is either passed into the enriched solvent or generated in situ by heating the solvent to vaporize water contained therein. As the steam passes off from the solvent, it carries dissolved volatile materials, such as $CO_2$, $H_2S$, etc., along with it.

Many of the solvents described above as being useful in forming the solvent compositions of this invention are hygroscopic, and can be used to dehydrate gas streams simultaneously with the removal of acidic gas components therefrom. Simultaneous dehydration and removal of acid gases has the unusual advantage that the water picked up by the solvent composition can subsequently function as the stripping vapor needed for solvent regeneration. If the feed gases are essentially dry, little or no water will be introduced into the solvent composition in this fashion, and water, or additional water, can be incorporated into the solvent composition (either before or after contacting it with the gas stream) to function as the stripping vapor during regeneration. Alternatively, the solvent composition may be used in substantially anhydrous form, and open steam can be used for the regeneration.

The following examples illustrate compositions according to the invention and their properties as compared to comparable prior art composition. In each case, the solvent composition was prepared by simply dissolving the indicated amine in the indicated solvent, in amount to provide the indicated concentration. The tests were all run at 100° F. using 2.5 N amine solutions.

TABLE I

| Solvent | Viscosity, centistokes | |
|---|---|---|
| | N-methyl ethanol-amine | Dialkanol amine |
| Sulfolane | 4.9 | [1] 14.7 |
| 2,2-dimethyl-1,3-dioxolane-4-methanol | 7.2 | [1] 28.4 |
| Diethylene glycol | 16.0 | [2] 27.0 |
| Methyl "Carbitol" (diethylene glycol monomethyl ether) | 3.0 | [2] 6.0 |
| bis-2-methoxyethyl ether | 1.1 | [2] Immiscible |
| Furfuryl alcohol | 4.5 | [2] 8.2 |
| Tetrahydrofurfuryl alcohol | 4.8 | [2] 9.3 |

[1] Diisopropanolamine.
[2] Diethanolamine.

From the above, it is apparent that the viscosities of compositions according to the invention, containing the secondary monohydric alkanolamine N-methylethanolamine, are markedly and surprisingly lower than compositions containing the conventional secondary amine, diisopropanolamine, or the closest analog diethanolamine.

Batch absorption tests were carried out in a 2-inch diameter, 8-inch tall cylindrical vessel, containing 100 ml. of the indicated solvent, maintained at 100° F. and agitated by a turbine agitator at 1200 r.p.m. In each test, $CO_2$ was passed into the solvent composition for a measured time interval, and the solvent composition was then analyzed to determine the amount of $CO_2$ absorbed. Based on the analytical results, the mass transfer coefficient KGa was computed. The results are given in Table II.

TABLE II

Solvent: KGa(lb.mols/hr./ft.³/atm.)
2.5 N diisopropanolamine in sulfolane (for comparison) _____ 0.11
2.5 N diisopropanolamine in 2,2-dimethyl-1,3-dioxolane-4 methanol (for comparison) ____ 0.09
2.5 N N-methylethanolamine in 2,2-dimethyl-1,3-dioxolane-4 methanol (Example 3) ____ 0.16

The results in Table II illustrate that the mass transfer rate coefficient of the composition according to the invention was significantly higher than that of either of the solvent compositions with which it was compared. This indicates that, for a given amount of $CO_2$ absorption required in a process, the contact time required is smaller with the solvent composition according to the invention than with the other solvent compositions. This in turn, means that smaller equipment sizes and/or more rapid throughput rates may be used, so that the overall capital and operating costs are correspondingly reduced.

The foregoing examples are illustrative. Similar results can be obtained in substantially the same way using the other solvent compositions contemplated within the scope of the invention, for example using other of the above-described solvents and/or other secondary monohydric alkanolamines, as mentioned elsewhere herein.

While the invention has been described in terms of certain preferred embodiments and illustrated by way of certain examples, these are illustrative only, as many alternatives and equivalents will readily occur to those skilled in the art, without departing from the spirit or proper scope of the invention. The invention is therefore not to be construed as limited, except as set forth in the appended claims.

We claim:
1. A process for removing acid gas constituents from a gas stream, comprising in combination the steps of
   (a) contacting said gas stream with a liquid solvent composition comprising (i) an organic solvent selected from the group consisting of cyclic ethers, acyclic ethers, glycol ethers, dioxanes and furans and which is liquid at room temperature, has a solubility for $CO_2$ at 25° C. and one atmosphere pressure of not less than about one volume of $CO_2$ per volume of solvent, is unreactive with amines and contains at least one functional group having the configuration C—O—C, and (ii) a secondary monohydric alkanolamine, and
   (b) separating said gas stream from said solvent composition and acid gas dissolved therein.
2. A process according to claim 1 wherein the functional groups C—O—C are present in number exceeding the number of hydroxyl groups when the solvent molecule contains more than one hydroxyl group.
3. A process according to claim 1 wherein the functional group C—O—C constitutes a portion of a heterocyclic ring.
4. A process according to claim 1 wherein the alkanolamine is present in amount between 0.1 and about 10 moles of alkanolamine per liter of solvent.

5. A process according to claim 1 wherein the alkanolamine is present in concentration between about 2.5 N and about 5.0 N with respect to the organic solvent.

6. A process according to claim 1 wherein the alkanolamine is N-methylethanolamine.

7. A process according to claim 1 wherein the alkanolamine is N-ethylethanolamine.

References Cited

UNITED STATES PATENTS

| | | | |
|---|---|---|---|
| 2,139,375 | 12/1938 | Millar et al. | 23—3 X |
| 3,161,461 | 12/1964 | Deal et al. | 23—3 |
| 3,383,838 | 5/1968 | Carson | 23—2 X |
| 2,065,112 | 12/1936 | Bottoms | 23—2 A |
| 2,600,328 | 6/1952 | Riesenfeld et al. | 23—3 LA |
| 2,445,468 | 7/1948 | Blohm et al. | 23—2 A |
| 3,502,428 | 3/1970 | Gelbein et al. | 23—2 |

FOREIGN PATENTS

| | | | |
|---|---|---|---|
| 734,577 | 8/1955 | Great Britain | 23—3 |

EARL C. THOMAS, Primary Examiner

U.S. Cl. X.R.

23—3 R